(12) United States Patent
Koops

(10) Patent No.: US 7,377,843 B2
(45) Date of Patent: May 27, 2008

(54) APPARATUS FOR STUNNING POULTRY

(75) Inventor: Henderikus Koops, Ede (NL)

(73) Assignee: Inalfa Roof Systems Group B.V., Venray (NL)

( * ) Notice: Subject to any disclaimer, the term of this patent is extended or adjusted under 35 U.S.C. 154(b) by 87 days.

(21) Appl. No.: 11/558,244

(22) Filed: Nov. 9, 2006

(65) Prior Publication Data
US 2007/0072532 A1 Mar. 29, 2007

Related U.S. Application Data

(63) Continuation of application No. 11/291,278, filed on Dec. 1, 2005, now abandoned.

(30) Foreign Application Priority Data
Dec. 6, 2004 (EP) .................................. 04106325

(51) Int. Cl.
*A22B 3/06* (2006.01)
(52) U.S. Cl. ....................................................... 452/58

(58) Field of Classification Search ............ 452/57–59, 452/141
See application file for complete search history.

(56) References Cited

U.S. PATENT DOCUMENTS

| 2,544,681 | A | * | 3/1951 | Harsham et al. ............... 426/55 |
| 3,258,811 | A | * | 7/1966 | Braun .......................... 452/60 |
| 4,221,021 | A | * | 9/1980 | Swilley ....................... 452/141 |
| 4,340,993 | A | * | 7/1982 | Cook .......................... 452/141 |
| 4,358,872 | A | * | 11/1982 | VanZandt .................... 452/141 |
| 5,643,072 | A | * | 7/1997 | Lankhaar et al. ............. 452/66 |
| 5,899,802 | A | * | 5/1999 | Burnett ........................ 452/141 |
| 5,954,572 | A | * | 9/1999 | Kettlewell et al. ............ 452/58 |

* cited by examiner

*Primary Examiner*—Thomas Price
(74) *Attorney, Agent, or Firm*—Steven M. Koehler; Westman, Champlin & Kelly, P.A.

(57) ABSTRACT

An apparatus for stunning poultry is provided, comprising a power source. A first device connected to a first pole of the power source for engaging the poultry and a probe connected to a second pole of the power source and configured for at least partially entering the vent of the poultry. The probe can have an enlarged head that is cone-shaped.

10 Claims, 1 Drawing Sheet

APPARATUS FOR STUNNING POULTRY

CROSS-REFERENCE TO RELATED APPLICATION

The present application is a continuation of and claims priority of U.S. patent application Ser. No. 11/291,278, filed Dec. 1, 2005, now abandoned, the content of which is hereby incorporated by reference in its entirety.

BACKGROUND OF THE INVENTION

The invention relates to an apparatus for stunning poultry, comprising a power source, a first device connected to a first pole of the power source for engaging the poultry and a second device connected to the opposite pole of the power source for engaging another body part of the poultry.

Although not strictly necessary, in practice the first device of such an apparatus for stunning poultry will be connected to the positive pole of the power source, while the second device is connected to the negative pole of the power source. In a known apparatus of this type said second devices are connected to a suspension conveyor for conveying the poultry while suspended from their legs. Thus, the negative pole of the power source then will engage the legs of the poultry.

Such an apparatus will encounter a severe problem, because the legs of poultry are covered with a thick skin which only poorly conducts electrical current. Thus, for obtaining satisfying stunning results one should apply high voltages. However, in the case that such high voltage are applied and, unexpectedly, the skin of the legs is better conductive than expected, such high voltages can cause damage to the poultry, which negatively influences the quality of the flesh after slaughtering. Especially, in such a case strong contractions of the breast muscles will occur which will lead to bleedings which give the final product (breast flesh) an unattractive appearance.

SUMMARY OF THE INVENTION

In accordance with an aspect of the present invention, an apparatus for stunning poultry includes a probe for at least partially entering the vent of the poultry.

The interior of the vent of the poultry always is moist in some degree, such that an excellent conduction of the electric current form the probe towards the poultry will occur. However, not only will the conductivity be increased, but it also will be more stable among a series of poultry, such that it can be predicted more precisely. The result is, that a more precise setting of the voltage between the first and second pole of the power source can be chosen, leading to reproducible results.

In one embodiment of the apparatus according to the present invention the probe comprises an elongate rod of which the forward end is provided with an enlarged head.

In the context of the present application "forward end" means the end of the elongate rod which will be inserted into the vent of the poultry first, i.e. the end of the elongate rod which is the leading end as seen in the direction of insertion.

Such an enlarged head has to be pushed past the orbicular muscle of the poultry, such that, once inserted, the probe obtains a stable positioning with an effective conductive contact between its surface and the surrounding vent.

When, in such a case, the enlarged head is cone-shaped, with the tip of the cone facing forward, inserting the probe into the vent of the poultry is promoted, because, firstly, the cone-shape provides for a locating effect of the probe relative to the vent, and, secondly, the cone-shape of the probe promotes a temporarily stretching of the orbicular muscle when the widest part of the cone-shaped head passes said muscle.

For avoiding damage to the vent region of the bird it is preferred, that the tip of the cone can be rounded.

Further, it is possible that the cone has a rearwards facing surface which is rounded, such that withdrawing the probe from the vent after stunning of the poultry has occurred, is promoted without the risk of damaging (tearing) the vent region of the poultry.

The stunning effect of the apparatus according to the present invention can be optimised when, in accordance with yet another embodiment, at least the part of the probe meant for entering the vent of the poultry has a highly polished surface. Such a highly polished surface promotes the conductivity of the probe.

In still another embodiment of the apparatus according to the present invention, the apparatus is meant for cooperation with a suspension conveyor for conveying the poultry while suspended from their legs, and comprises a rotating carrousel-like device which carries at regular intervals along its circumference a number of probes, wherein a relative upward and downward movement between the probes and the poultry occurs when the suspension conveyor conveys the poultry around part of the circumference of the carousel-like device.

When a bird suspended from the suspension conveyor approaches the carousel-like device, the relative position between the vent of the bird and the assigned probe is such, that the probe assumes a position at a higher level than the vent. During movement of the bird around part of the circumference of the carousel-like device, the relative position between the vent of the bird and probe changes such that the probe firstly will enter the vent and next again will leave the vent. In the position within the vent the power source is activated and the poultry is stunned. When the probe has been withdrawn from the vent, the bird, being suspended from the suspension conveyor, leaves the circumference of the carousel-like device.

Two possibilities occur: firstly the probes can be movable upwards and downwards along respective guides through the cooperation between a stationary curve and movable follower attached to the probes. In such a case the poultry substantially maintains a position at a constant level. Secondly, the poultry may be moved upwards and downwards through an appropriate shape of the suspension conveyor, in which case the probes substantially maintain a constant level. However, also a combination of these two possibilities may be realised.

When, as is known from the state of the art, the apparatus is of the type in which the first device comprises an electrically conductive liquid in which the head of the poultry is to be submerged, another problem may arise. In a state of the art apparatus of such a type a large liquid container is used in which a number of birds are submerged simultaneously. As a result, a certain electrical current will run through each bird. However, when such an apparatus is started up after a period of stand-still, firstly only one bird will be submerged in the liquid, and the number of submerged birds will then gradually increase. When only one or few birds are submerged, a much stronger current will run through those birds, having corresponding detrimental effects as described above with respect to an increase of the voltage.

Thus, for providing a solution for such a problem, in accordance with another aspect of the present invention an embodiment of the apparatus is presented, in which the liquid is contained in a number of successive containers, such that during operation of the apparatus each separate container will receive only one poultry head simultaneously. Because each container only receives one poultry head simultaneously, the electrical current running through such a poultry head always will be the same, irrespective whether the apparatus is starting up or already in full operation.

When, in such a case, the apparatus is meant for cooperation with a suspension conveyor for conveying the poultry while suspended from their legs, it comprises a rotating carousel-like device which carries at regular intervals along its circumference a number of liquid containers, wherein a relative upward and downward movement between the containers and the poultry occurs when the suspension conveyor conveys the poultry around part of the circumference of the carousel-like device.

Again, two possibilities occur: the liquid containers are movable upwards and downwards along respective guides through the cooperation between a stationary curve and movable follower attached to the containers (in which case basically the poultry are maintained at a constant level), or the poultry is movable upwards and downwards through an appropriate shape of the suspension conveyor (in which case the liquid containers are maintained substantially at a constant level). Again, a combination of these possibilities may be applied.

BRIEF DESCRIPTION OF THE DRAWINGS

Hereinafter the invention will be elucidated while referring to the drawing, in which an embodiment of the apparatus according to the present invention is illustrated.

DESCRIPTION OF THE ILLUSTRATIVE EMBODIMENT

Figure 1:
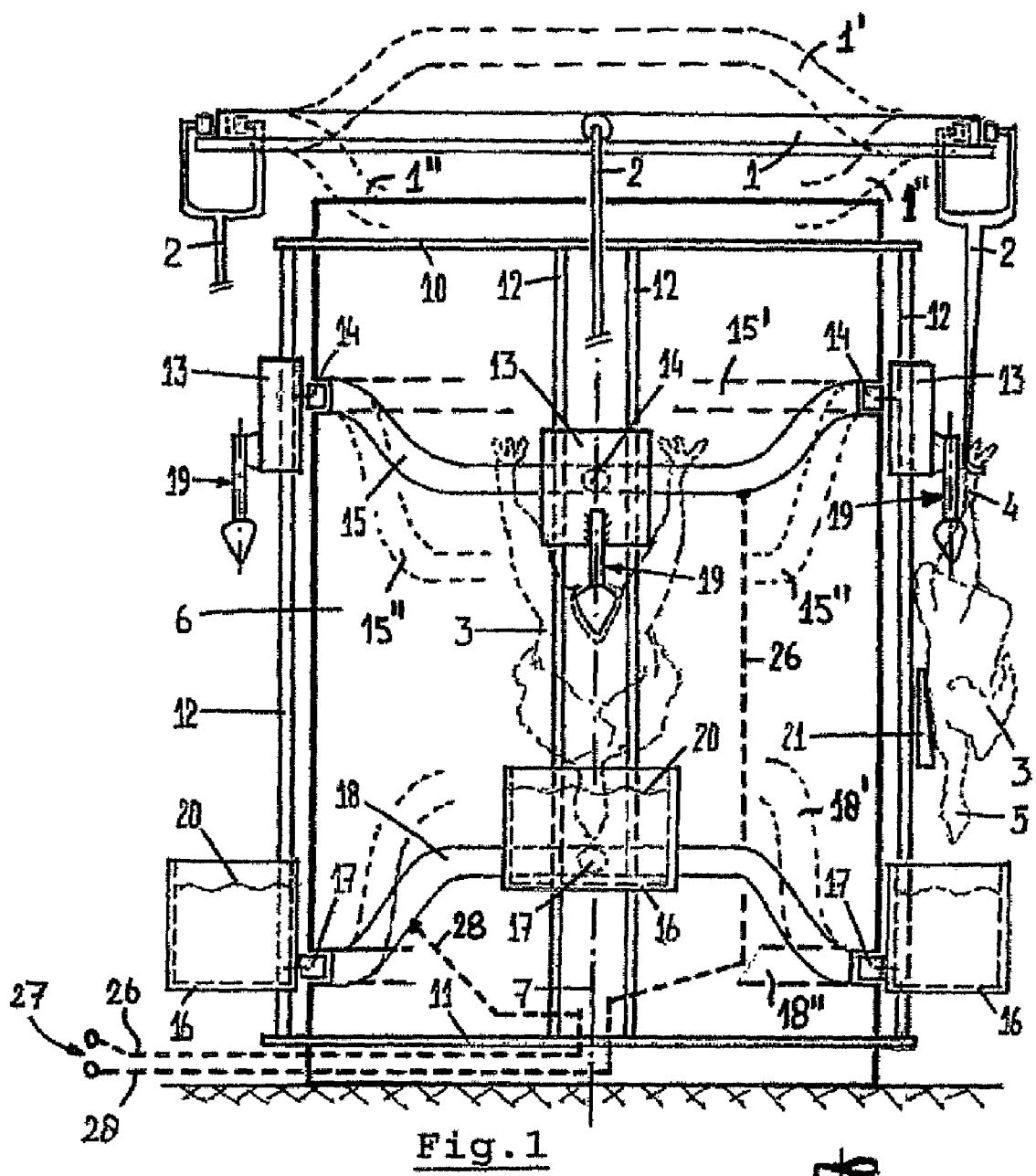
FIG. 1 shows, schematically, a side elevational view of an embodiment of the apparatus.

Firstly referring to FIG. 1, an embodiment of an apparatus for stunning poultry is illustrated which is meant for cooperation with a suspension conveyor 1. Such a suspension conveyor, which is known per se, comprises shackles 2 from which poultry 3 is suspended from their legs 4. That means that the head 5 of the poultry 3 is directed downwards.

Figure 2:
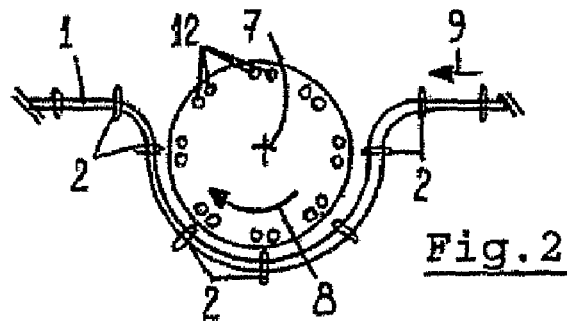
FIG. 2 shows, on a reduced scale and extremely schematically, a top plan view.

In the illustrated embodiment an apparatus according to the present invention comprises a rotating carousel-like device which is provided with a stationary core 6. In a manner not illustrated in detail this stationary core 6 carries a frame which can be rotated around a central axis 7. In FIG. 2 the direction of rotation of the frame around the central axis 7 has been indicated by arrow 8. Likewise, the direction of travel of the suspension conveyor 1 has been indicated by arrow 9. As illustrated, the suspension conveyor 9 partly encircles the carousel-like device.

Again referring to FIG. 1, the frame of the carousel-like device comprises an upper support plate 10 and a lower support plate 11. Between these support plates 10 and 11 pairs of guiding rods 12 extend vertically. As illustrated clearly in FIG. 2, a number of said pairs of guiding rods 12 is spaced at regular intervals along the circumference of the carousel-like device. In the embodiment illustrated schematically in FIG. 2 eight of such pairs are provided; in FIG. 1, however, some of these pairs have been omitted for simplifying the drawing.

The guiding rods 12 illustrated in FIG. 1 at the right-hand side correspond with the guiding rods 12 at the three o'clock position in FIG. 2; likewise the guiding rods 12 positioned centrally in FIG. 1 correspond with the guiding rods at the six o'clock position in FIG. 2, whereas the guiding rods 12 at the left-hand position in FIG. 1 correspond with the nine o'clock position in FIG. 2.

Each pair of guiding rods 12 firstly carries an upper sliding block 13 which carries a follower roll 14 that cooperates with a stationary curve 15 in the stationary core 6. Further each pair of guiding rods 12 carries a second sliding block 16 which carries a follower roll 17 that cooperates with a stationary curve 18 in the stationery core 6.

The upper sliding block 13 carries a second device used to stun the poultry, herein comprising a probe 19 which is meant for insertion into the vent of the poultry 3; the lower sliding block 16 is shaped as a liquid container containing a conductive fluid 20. In one embodiment, a separate container of conductive fluid 20 is provided for each poultry. The conductive fluid 20 comprises a first device used to stun poultry. In an alternative embodiment, a container having conductive fluid for receiving two or more poultry heads can be used. As appreciated by those skilled in the art, in some embodiments, the first device can take many forms with the requirement only that the first device engages the poultry in a manner to make an electrical connection.

The curve 15, roll 14, sliding block 13 and probe 19 are made of a conductive material, such that through line 26 the probe 19 is connected to a first pole of the power source 27, preferably the negative pole. Likewise, the conductive fluid 20 is connected to the opposite pole (preferably the positive pole) of the power source 27 through line 28, curve 18, roll 17 and sliding block 16.

In operation poultry 3, which is conveyed by the suspension conveyor 1, reaches the carousel-like device at the three o'clock position illustrated in FIG. 2. As shown in FIG. 1, in this position the upper sliding block 13 is at a high position, in which the probe 19 does not engage the poultry 3. Likewise the lower sliding block (liquid container) 16 is in a low position, in which the head 5 of the poultry 3 is above the conductive liquid 20. When the frame of the device rotates as indicated by arrow 8 in FIG. 2, the follower rolls 14 and 17 of the sliding blocks 13 and 16, respectively, will follow the respective stationary curves 15 and 18, respectively, and will move downwardly and upwardly, respectively, to the positions illustrated in FIG. 1 in the central location. In these positions the probe 19 has entered the vent of the poultry 3, whereas the head 5 of the poultry is submerged in the conductive fluid 20 in the liquid container 16. Now the power source is activated and an electrical current runs through the body of the poultry, stunning the bird.

During a continued rotation of the device the upper sliding block 13 again will move to its high position, whereas the liquid container 16 will move towards its low position, in which the bird 3 again is free (in FIG. 1 the bird has not been illustrated in this location, but it will assume a position which corresponds with the position illustrates at the right-hand side of the figure).

Each successive bird arriving along the suspension conveyor 1 will be processed in this manner.

It is also possible that the poultry is movable upwards and downwards through an appropriate shape of the suspension conveyor 1. The shape 1' thereof will correspond with the shape 15' of the upper curve and shape 18' of the lower curve to obtain the appropriate relative movements between the poultry 3, probe 19 and container 16. Likewise the shape 1" thereof will correspond with the shape 15" of the upper curve and shape 18" of the lower curve.

In FIG. 1 further a support 21 has been illustrated schematically, which serves for locating and maintaining the poultry 3 in a correct position. Such support may be stationary, but also can be movable with the poultry, for example under influence of the cooperation between the curve and the follower.

Figure 3:
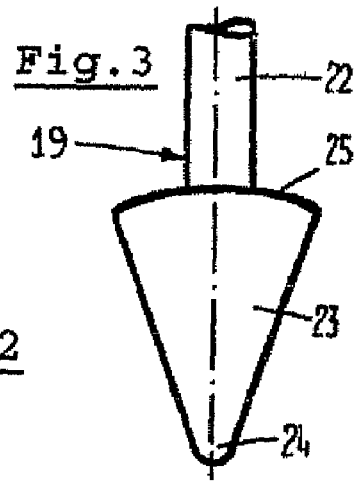
FIG. 3 shows on an enlarged scale a detail of a probe.

FIG. 3 shows part of the probe 19. It comprises an elongate rod 22 of which the forward end is provided with an enlarged head 23. The enlarged head is cone-shaped, with the tip 24 of the cone facing forward. In the illustrated embodiment the tip of the cone is rounded.

Further the cone has a rearwardly facing surface 25 which also is rounded.

The operative surfaces of the probe (especially the surface of the cone-shaped head 23) preferably are highly polished.

The probe 19 will enter the vent of a bird 3 with its cone-shaped head 23, and will realise a good conductive interface for an electrical current.

The invention is not limited to the embodiment described before, which may be varied widely within the scope on the invention as defined by the appending claims.

What is claimed is:

1. In combination with at least one poultry having a vent, an apparatus for stunning the poultry, comprising:
   a power source having two poles;
   a probe electrically connected to one of the two poles, the pole being of size so as to be insertable into the vent of the at least one poultry;
   a conveyor, wherein the poultry is attached to the conveyor; and
   a mechanism configured to provide relative movement between the probe and the vent of the poultry to insert and withdraw the robe with respect to the vent as the conveyor conveys the poultry through the apparatus.

2. The combination of claim 1 and further comprising a device connected to a second of the two poles and configured to engage another part of the body of the poultry.

3. The combination of claim 2 wherein the device comprises an electrically conductive liquid in which the head of the at least one poultry is to be submerged.

4. The combination of claim 1, wherein the probe is one of a plurality probes positioned at regular intervals along a portion of the conveyor.

5. The combination of claim 4, wherein the plurality of probes are movable upwards and downwards along respective guides through cooperation between a stationary curve and movable follower attached to each of the plurality of probes.

6. The combination of claim 4, wherein the plurality of probes are movable upwards and downwards along respective guides through the cooperation between a stationary curve and movable follower attached to each of the plurality of probes.

7. The combination of claim 1, wherein the conveyor is a rotating carousel-like device, and wherein the probe is one of a plurality probes positioned at regular intervals along a portion of the circumference of the conveyor.

8. The combination of claim 1, wherein the mechanism is configured to move the poultry upwards and downwards with respect to the probe.

9. The combination of claim 1 and further comprising a plurality of containers, each including an electrically conductive liquid connected to a second of the two poles, such that during operation of the apparatus each of the plurality of containers receives at most a head of one poultry.

10. The combination of claim 9, wherein the plurality of containers are movable upwards and downwards along respective guides through cooperation between a stationary curve and movable follower attached to the containers.

* * * * *

UNITED STATES PATENT AND TRADEMARK OFFICE
CERTIFICATE OF CORRECTION

PATENT NO. : 7,377,843 B2 Page 1 of 1
APPLICATION NO. : 11/558244
DATED : May 27, 2008
INVENTOR(S) : Henderikus Koops It is certified that error appears in the above-identified patent and that said Letters Patent is hereby corrected as shown below:

Title page, item 73, delete "Inalfa Roof Systems Group B.V., Venray (NL)" and insert --Rico Research B.V., Wormer, (NL)--.
Column 6, line 9, delete "plurality probes" and insert --plurality of probes--.
Column 6, line 24, delete "plurality probes" and insert --plurality of probes--.

Signed and Sealed this

Ninth Day of June, 2009

JOHN DOLL
*Acting Director of the United States Patent and Trademark Office*